United States Patent [19]

Kashiwazaki et al.

[11] Patent Number: 5,696,182
[45] Date of Patent: Dec. 9, 1997

[54] INK, INK-JET RECORDING PROCESS MAKING USE OF THE INK, AND APPARATUS USING THE INK

[75] Inventors: Akio Kashiwazaki, Yokohama; Yuko Suga, Tokyo; Katsuhiro Shirota, Inagi; Hiromichi Noguchi, Atsugi; Aya Takaide, Yokohama, all of Japan

[73] Assignee: Canon Kabushiki Kaisha, Tokyo, Japan

[21] Appl. No.: 209,257

[22] Filed: Mar. 14, 1994

[30] Foreign Application Priority Data

Mar. 15, 1993 [JP] Japan .................... 5-054196
Mar. 26, 1993 [JP] Japan .................... 5-068471

[51] Int. Cl.$^6$ ........................................ C09D 11/10
[52] U.S. Cl. ............... 523/161; 523/160; 524/196; 524/198; 524/513; 524/523; 106/20 R; 106/20 D
[58] Field of Search .................. 523/160, 161; 524/513, 523, 560, 196, 198; 106/20 R, 20 D

[56] References Cited

U.S. PATENT DOCUMENTS

| | | | |
|---|---|---|---|
| 4,585,484 | 4/1986 | Haruta et al. | 106/22 B |
| 4,683,002 | 7/1987 | Miura et al. | 106/20 R |
| 4,686,246 | 8/1987 | Gajria | 523/161 |
| 4,950,303 | 8/1990 | Ishii | 8/513 |
| 5,118,351 | 6/1992 | Shirota et al. | 106/22 R |
| 5,151,128 | 9/1992 | Fukushima et al. | 106/20 R |
| 5,160,370 | 11/1992 | Suga et al. | 106/19 R |
| 5,172,133 | 12/1992 | Suga et al. | 347/100 |
| 5,184,148 | 2/1993 | Suga et al. | 347/100 |
| 5,229,786 | 7/1993 | Suga et al. | 347/100 |
| 5,281,261 | 1/1994 | Lin | 106/20 R |
| 5,316,575 | 5/1994 | Lent et al. | 106/20 R |
| 5,329,305 | 7/1994 | Fukushima et al. | 347/95 |
| 5,354,369 | 10/1994 | Shimomura et al. | 106/22 H |

FOREIGN PATENT DOCUMENTS

| | | |
|---|---|---|
| 56-147863 | 11/1981 | Japan . |
| 59-056466 | 3/1984 | Japan . |
| 59-078273 | 5/1984 | Japan . |
| 59-093765 | 5/1984 | Japan . |
| 59-174664 | 10/1984 | Japan . |
| 61-113668 | 5/1986 | Japan . |
| 61-113669 | 5/1986 | Japan . |
| 64031642 | 2/1989 | Japan . |
| 2255875 | 10/1990 | Japan . |

OTHER PUBLICATIONS

Derwent (Database WPI) AN 84–058651 with respect to Japanese Patent Document No. 59–015461 (Jan. 26, 1984).

*Primary Examiner*—Paul R. Michl
*Assistant Examiner*—John J. Guarriello
*Attorney, Agent, or Firm*—Fitzpatrick, Cella, Harper & Scinto

[57] ABSTRACT

An ink comprising water, a water-soluble organic solvent, a coloring material and a water-soluble oligomer, wherein said water-soluble oligomer is a polymer comprising at least one of monomers represented by the formulae (I), (II) and (III):

$$CH_2=C(R)-COO-(CH_2CH_2O)_m(CH_2)_pH \quad (I)$$

$$CH_2=C(R)-COO-(CH_2CH_2O)_q-phenyl-(CH_2)_rH \quad (II)$$

$$CH_2=C(X)-COO-R_3 \quad (III)$$

or a water-soluble polyurethane obtained from monomers comprising a carboxyl type hydrophilic diol having two hydroxyl groups and one or two carboxyl groups, a diisocyanate monomer and an acetylene glycol type hydrophobic diol represented by the formula $$R_1-CH_2-\underset{\underset{CH_3}{|}}{\overset{\overset{CH_3}{|}}{C}}-C\equiv C-\underset{\underset{OR_4}{|}}{\overset{\overset{CH_3}{|}}{C}}-CH_2-R_2. \quad (IV)$$

8 Claims, 3 Drawing Sheets

INK, INK-JET RECORDING PROCESS MAKING USE OF THE INK, AND APPARATUS USING THE INK

BACKGROUND OF THE INVENTION

1. Field of the Invention

The present invention relates to an ink suitably used in ink-jet recording apparatus, an ink-jet recording process and apparatus making use of the ink. More particularly, it is concerned with an ink, and an ink-jet recording process and apparatus, that can make a record in a high density, at a superior quality level and in a good fixing performance, using what is called plain paper such as woodfree paper, paper for copying, letter paper, thermal transfer paper and business form paper for wire-dot-matrix printers.

2. Related Background Art

Water-based inks prepared by dissolving a water-soluble dye in an aqueous medium are hitherto used as ink-jet recording solutions. Such recording solutions are required;
(1) to give images with a sufficient density;
(2) to have good drying properties on recording mediums;
(3) to cause no feathering in recorded images;
(4) to cause no bleeding of recorded images even when brought into contact with water, alcohol or the like;
(5) to provide recorded images with a good lightfastness;
(6) to cause no clogging at the nozzle tips;
(7) to cause no difficulties such as blurring of recorded images when printing is continuously carried out or again started after being left standing for a long time;
(8) to be stable throughout storage;
(9) to have no problem regarding the safety of users; and
(10) to cause no problems during use, even when brought into contact with members that constitute the recording means. In ink-jet recording systems that utilize heat energy, recording solutions are required, in addition to the foregoing requirements;
(11) to have a good fastness to heat and have no adverse influence on heat energy generating devices.

In relation to these properties, the above requirements involves trade-offs in the material constitution of ink-jet recording solutions hitherto put into practical use, and it has become difficult to satisfy the requirements made on performance in recent years. Almost all of the recording solutions hitherto put into practical use comprise a water-soluble dye, water and a water-soluble organic solvent, and it has been particularly difficult to satisfy both print quality level and fixing performance. It is hitherto typically known to add water-soluble resins such as polyvinyl pyrrolidone, polyvinyl alcohol and cellulose derivatives to water-based recording solutions so that any irregular feathering can be decreased and the quality level can be elevated. Such materials, however, may cause an increase in the viscosity of the ink which lowers response frequencies, make the initial ejection response poor because of an increase in viscosity caused by drying at nozzle tips, and conversely results in poor evaporative drying performance after printing. Because of such problems, the recording solutions must be said to have not achieved a satisfactory utility.

In order to improve a fixing performance, it is proposed to use a method in which a surface active agent is added to a recording solution in an amount more than its critical micelle concentration. Use of this method can achieve very rapid penetration of the recording solution, so that the recording solution can penetrate relatively regardless of the kind of paper, the surface irregularities of paper and so forth, and prints with less irregular feathering can be obtained. However, the spread of dots of the recording solution is so large that the prints can not possibly be prevented from having a density that smears. Thus, this is a means which solves the problems only with difficulty. In other words, there also are limits on the use of surface active agents.

SUMMARY OF THE INVENTION

Accordingly, an object of the present invention is to eliminate the above disadvantages that can not be eliminated by adding the existing water-soluble resins used in the prior art, and to provide a novel ink suited for ink-jet recording that can ensure both the fixing performance and the print quality level required in water-based inks.

Other objects of the present invention are to provide an ink-jet recording process making use of such an ink and an ink-jet recording apparatus using such an ink.

The above objects can be achieved by the invention described below.

The present invention is an ink comprising water, a water-soluble organic solvent, a coloring material and a water-soluble oligomer, wherein said water-soluble oligomer is a polymer comprising at least one of the monomers represented by the following Formulae (I), (II) and (III), or a water-soluble polyurethane obtained from monomers comprising an acetylene glycol type hydrophobic diol represented by the following Formula (IV), a carboxyl type hydrophilic diol having two hydroxyl groups and one or two carboxyl groups and a diisocyanate monomer.

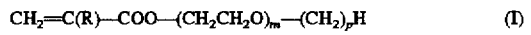

$$CH_2=C(R)-COO-(CH_2CH_2O)_m-(CH_2)_pH \quad (I)$$

wherein R is a hydrogen atom or a methyl group, m is an integer of 2 to 24 and p is an integer of 1 to 16.

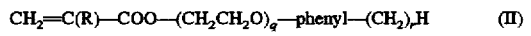

$$CH_2=C(R)-COO-(CH_2CH_2O)_q-phenyl-(CH_2)_rH \quad (II)$$

wherein R is a hydrogen atom or a methyl group, q is an integer of 2 to 24 and r is an integer of 0 to 16.

$$CH_2=C(X)-COO-R_3 \quad (III)$$

wherein $R_3$ is $-CH(CH_2OZ_1)(CH_2OZ_2)$ or $-CH_2\{CHOZ_1(CH_2OZ_2)\}$, X is a hydrogen atom or a methyl group, one of $Z_1$ and $Z_2$ is a hydrogen atom and the other is an alkyl group having 4 to 16 carbon atoms or a residual group of an aliphatic acid ester.

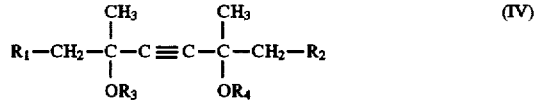

$$R_1-CH_2-\underset{OR_3}{\overset{CH_3}{\underset{|}{C}}}-C\equiv C-\underset{OR_4}{\overset{CH_3}{\underset{|}{C}}}-CH_2-R_2 \quad (IV)$$

wherein $R_1$ and $R_2$ are each $CH_3-CH_2-$ or

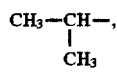

$$CH_3-CH-,\\ \quad |\\ \quad CH_3$$

$R_3$ is $-(CH_2CH_2O)_n-H$ and $R_4$ is $-(CH_2CH_2O)_m-H$, where n+m is a number, N, wherein N=0 or $3\leq N \leq 30$.

The present invention is also an ink-jet recording process comprising ejecting an ink from an orifice according to recording signals to make a record on a recording medium, wherein said ink is the ink described above.

The present invention is still also a recording unit comprising an ink holder that holds an ink, and a head assembly for ejecting the ink in the form of ink droplets, wherein said ink is the ink described above.

The present invention is further an ink-jet recording apparatus comprising a recording head for ejecting ink droplets, an ink cartridge having an ink holder that holds an ink, and an ink feeding means for feeding the ink to the recording head, wherein said ink is the ink described above.

DETAILED DESCRIPTION OF THE PREFERRED EMBODIMENTS

Figure 1:
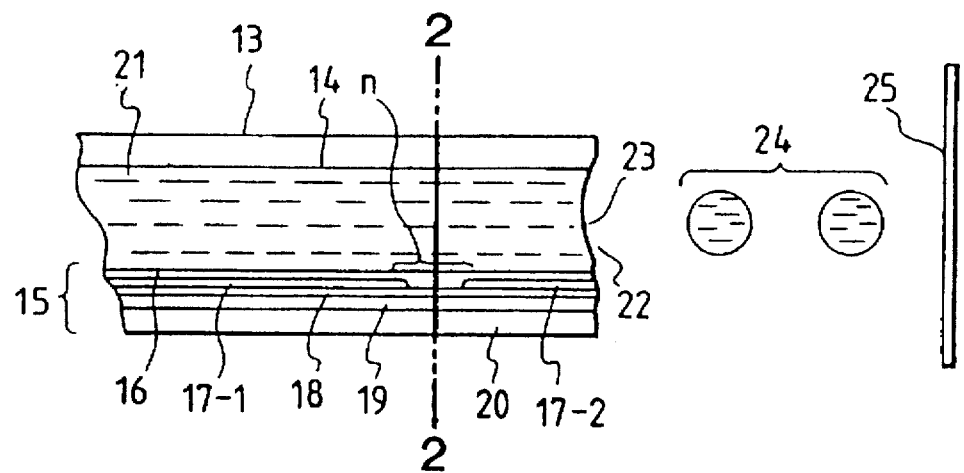
FIG. 1 illustrates a longitudinal cross section of a head assembly of an ink-jet recording apparatus.

The ink of the present invention basically comprises water, a water-soluble organic solvent, a coloring material and a water-soluble oligomer.

In a first embodiment of the ink of the present invention, the water-soluble oligomer is a polymer comprising at least one of monomers represented by the formula

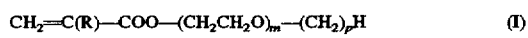

$$CH_2=C(R)-COO-(CH_2CH_2O)_m-(CH_2)_pH \quad (I)$$

wherein R is a hydrogen atom or a methyl group, m is an integer of 2 to 24 and p is an integer of 1 to 16, the formula

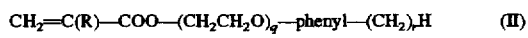

$$CH_2=C(R)-COO-(CH_2CH_2O)_q-phenyl-(CH_2)_rH \quad (II)$$

wherein R is a hydrogen atom or a methyl group, q is an integer of 2 to 24 and r is an integer of 0 to 16, and the formula

$$CH_2=C(X)-COO-R_3 \quad (III)$$

wherein $R_3$ is $-CH(CH_2OZ_1)(CH_2OZ_2)$ or $-CH_2\{CHOZ_1(CH_2OZ_2)\}$, X is a hydrogen atom or a methyl group, one of $Z_1$ and $Z_2$ is a hydrogen atom and the other is an alkyl group having 4 to 16 carbon atoms or a residual group of an aliphatic acid ester.

This water-soluble oligomer is highly water-soluble and has a low glass transition temperature. Hence, it brings about the following effects.

(1) Even when a liquid medium has evaporated at the Orifice, no dried film can be formed, nozzles are difficult to clog, and start-up performance may deteriorate.

(2) Since the oligomer side chain has the same structure as glycols widely used in ink mediums, the oligomer is effective also for preventing evaporation of the liquid medium itself.

(3) The long side chain has hydrophilic properties or has both hydrophobic properties and hydrophilic properties, and hence appropriately promotes the penetration of liquid droplets.

(4) Because of a strong affinity of the oligomer for a water-soluble solvent, the ink can be stopped from diffusing into small voids in the course of drying, and then irregular feathering on a recording medium can be decreased.

(5) Because of an affinity of the side-chain surface active groups for the paper, penetration into large voids can be promoted to make fixing time shorter.

(6) After the liquid medium has evaporated, the hydrophobic side chain comes to the surface to contribute to the retention of water-fastness.

On account of the operation and effect attributable to the water-soluble oligomer as stated above, it becomes possible to ensure both the fixing performance and the print quality level without the trade-off of conventional water-based inks.

The water-soluble oligomer used in the first embodiment of the present invention will be described below in detail.

Examples of monomers represented by Formula (I) may preferably include methoxytriethylene glycol acrylate (R=H, m=3, p=1): NK Ester AM-30G, methoxypolyethylene glycol #400 acrylate (R=H, m=ca 10, p=1): NK Ester AM-90G, methoxydiethylene glycol methacrylate (R=$CH_3$, m=2, p=1): NK Ester M-20G, methoxytetraethylene glycol methacrylate (R=$CH_3$, m=4, p=1): NK Ester M-40G, methoxypolyethylene glycol #400 methacrylate (R=$CH_3$, m=ca 10, p=1): NK Ester M-90G, methoxypolyethylene glycol #1000 methacrylate (R=$CH_3$, m=ca 24, p=1): NK Ester M-230G, and butoxydiethylene glycol acrylate (R=H, m=2, p=4): NK Ester AB-20G (trade names of products available from Shin-Nakamura Chemical Co., Ltd.).

Examples of monomers represented by Formula (II) may preferably include phenoxyethyl acrylate (R=H, q=1, r=0): NK Ester AMP-10G, phenoxydiethylene glycol acrylate (R=H, q=2, r=0): NK Ester AMP-20G, phenoxypolyethylene glycol acrylate (R=H, q=ca 5; r=0): NK Ester AMP-60G, nonylphenoxyethyl acrylate (R=H, q=1, r=8): NK Ester NPA-10G, and nonylphenoxypentaethylene glycol acrylate (R=H, q=5, r=9): NK Ester NPA-5E (trade names of products available from Shin-Nakamura Chemical Co., Ltd.).

Examples of monomers represented by Formula (III) may preferably include fatty acid monoesters of glycerol or monoesters of alkylcarboxylic acids. These substances can be readily produced by reacting glycerol with an alkylcarboxylic acid having 1 to 16 carbon atoms or a fatty acid to effect esterification to give compounds having a hydrophilic group introduced at their terminal.

The water-soluble oligomer used in the present invention has a surface active monomer described above and a glass transition temperature of 15° C. or below, and is liquid at normal temperature and under normal pressure. This is brought about when the oligomer mainly comprises surface active monomers having a highly flexing side chain.

The water-soluble oligomer used in the present invention may preferably have a specific acid value. When the water-soluble oligomer has an acid value of from 50 to 200 and has a number average molecular weight of less than 7,000, it can be effective for preventing irregular feathering because of its strong affinity for the water-soluble organic solvent and also because of the cohesive force it has when the liquid medium evaporates.

Additionally important features of the water-soluble oligomer are a high wettability to plain paper, and a high penetration speed in spite of less feathering. This is a feature that has not been obtainable in conventional surface active agents or water-soluble polymers.

The monomers capable of imparting the acid value preferably required in the water-soluble oligomer used in the present invention are preferably exemplified by acrylic acid, methacrylic acid, crotonic acid, isocrotonic acid, vinylacetic acid, fumaric acid, maleic acid, and acrylates such as acrylate CH (acrylate of hydroxycyclohexane, a product available from Mitsubishi Rayon Co. Ltd.), NK-Ester CB-1 (β-methacryloyloxyethyl hydrogenphthalate), NK-Ester SA (β-methacryloyloxyethyl hydrogensuccinate), NK-Ester ACB-100 (β-acryloyloxyethyl hydrogenphthalate), NK-Ester ACB-200 (β-acryloyloxypropyl hydrogenphthalate) and NK-Ester A-SA (β-acryloyloxyethyl hydrogensuccinate) (products available from Shin-Nakamura Chemical Co., Ltd.).

Hydrophobic monomers used in the water-soluble oligomer in the present invention may include styrene, styrene derivatives such as α-methylstyrene and vinyltoluene, and alkyl acrylates or methacrylates. The alkyl acrylates or methacrylates include methyl acrylate or methacrylate, ethyl acrylate or methacrylate, propyl acrylate or methacrylate, isopropyl acrylate or methacrylate, n-butyl acrylate or methacrylate, sec-butyl acrylate or methacrylate, tert-butyl acrylate or methacrylate, 2-methylbutyl acrylate or methacrylate, 2-ethylbutyl acrylate or methacrylate, 3-methylbutyl acrylate or methacrylate, 1,3-dimethylbutyl acrylate or methacrylate, pentyl acrylate or methacrylate, 3-pentyl acrylate or methacrylate, hexyl acrylate or methacrylate, 2-ethylhexyl acrylate or methacrylate, heptyl acrylate or methacrylate, octyl acrylate or methacrylate, nonyl acrylate or methacrylate, 2-ethoxyethyl acrylate or methacrylate, 3-ethoxypropyl acrylate, 2-ethoxybutyl acrylate, 3-ethoxybutyl acrylate and dimethylaminoethyl acrylate.

The amount of these three types of monomers, i.e., the foregoing (1) surface active monomer, (2) monomer capable of imparting the stated acid value, and (3) hydrophobic monomer, used in the polymer is determined taking account of the glass transition temperature of the resulting polymer and the balance of its hydrophobicity and hydrophilicity. Among these, the monomer capable of imparting the acid value is used in an amount determined according to the kind of monomers so as to have an acid value of from 50 to 200, and preferably an acid value of from 50 to 150.

The surface active monomer in the present invention is used in an amount of from 5 to 85% by weight. The hydrophobic monomer is used in an amount of 30% by weight at maximum based on the total weight of the surface active monomer capable of imparting the acid value and the hydrophobic monomer.

Use of the surface active monomer in an amount of less than 5% by weight is not effective for well improving fixing performance. Its use in an amount more than 85% by weight may reduce the effects attributable to the monomer capable of imparting the acid value and the hydrophobic monomer, resulting in no improvement in the print density and the print quality level.

In the present invention, the water-soluble oligomer may be used in an amount of from 0.1 to 5% by weight in the ink. Use of the oligomer in an amount less than 0.1% by weight does not improve fixing performance. Its use in an amount more than 5% by weight may make the permeability of the ink too strong, resulting in no improvement in the print density and the print quality level. Accordingly, for its specific amount, an optimum value is determined taking account of the viscosity of the ink, ejection performance and so forth according to the molecular weight of the oligomer and the degree of water-solubility.

A second embodiment of the ink of the present invention will be described below.

In the second embodiment Of the ink of the present invention, the water-soluble oligomer is a water-soluble polyurethane obtained from monomers comprising a carboxyl type hydrophilic diol having two hydroxyl groups and one or two carboxyl groups, a diisocyanate monomer and an acetylene glycol type hydrophobic diol represented by the formula

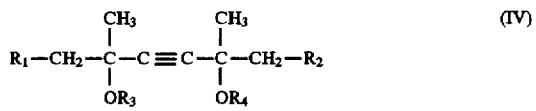

wherein $R_1$ and $R_2$ are each $CH_3-CH_2-$ $$CH_3-CH-,\ |\ CH_3$$

a number, N, wherein $N=0$ or $3 \leq N \leq 30$.

The acetylene glycol type hydrophobic diol used in the second embodiment can be obtained using as a starting material for its synthesis reaction a substance known by itself as a surface active agent. That is, the diol includes the following.

Hydrophobic diol (1)
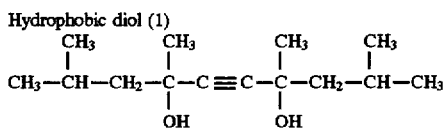

Hydrophobic diol (2)
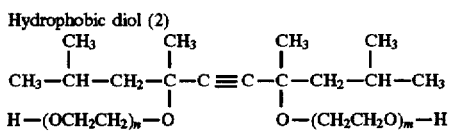

where the sum of (n+m) is from 3 to 30.

Hydrophobic diol (3)
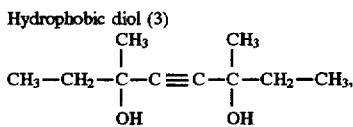

Hydrophobic diol (4)
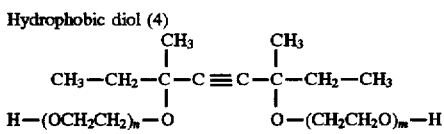

where the sum of (m+n) is from 3 to 30.

Acetylene glycols are produced by Air Products & Chemicals, Inc. (Allentown, U.S.A.), Nisshin Chemical Industry Works, Ltd. (Japan), Kawaken Fine Chemicals Co., Ltd. (Japan) and so forth, from which the above compounds are available as surface active agents.

The carboxyl type hydrophilic diol having two hydroxyl groups and one or two carboxylic groups includes compounds as described below. Hydrophilic diol (1) is a substance commercially available in a chemical name of dimethylolpropionic acid. Hydrophilic diol (3) and the following are all esters obtained by reacting a polyhydric alcohol such as glycerol or pentaerythritol with a polybasic said anhydride such as succinic anhydride, phthalic anhydride, trimellitic anhydride and the like. Such substances can be variously formed as derivatives from polyhydric alcohol and polybasic acid anhydrides other than the foregoing. Of these, the substances shown below are suited for the synthesis of the water-soluble urethane oligomer of the present invention. Diol groups react with polyhydric isocyantes, and are used in chain reaction. As for carboxyl groups, they act as functional groups capable of imparting an antonic water-solubility.

Hydrophilic diol (1)

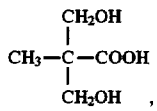

Hydrophilic diol (2)

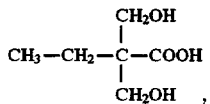

Hydrophilic diol (3)

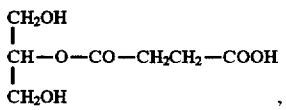

Hydrophilic diol (4)

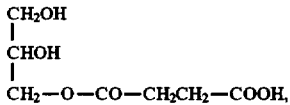

Hydrophilic diol (5)

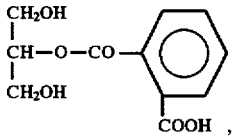

Hydrophilic diol (6)

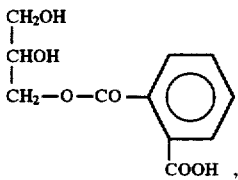

Hydrophilic diol (7)

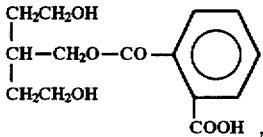

Hydrophilic diol (8)

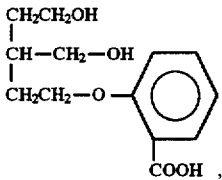

Hydrophilic diol (9)

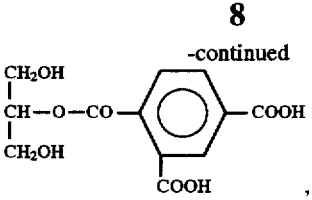

Hydrophilic diol (10)

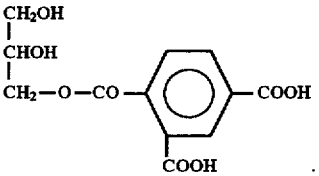

The diisocyanate compound constituting the water-soluble polyurethane used in the present invention may include tolylene diisocyanate, hexamethylene diisocyanate, diphenylmethane diisocyanate, isophorone diisocyanate, xylylene diisocyanate, bis(isocyanatomethyl)cyclohexane, dicyclohexylmethane diisocyanate, lysine diisocyanate, trimethylhexamethylene diisocyanate, and adducts, urethane-modified products, allophanate-modified products, buffet-modified products, isocyanurate-modified products or urethane prepolymers of tolylene diisocyanate and hexamethylene diisocyanate, which are conventionally known in the art. To synthesize the water-soluble polyurethane of the present invention, bifunctional isocyanates are basically used. In instances in which the water-soluble polyurethane is made to have a branched structure, it is of course possible to use trifunctional or higher polyhydric isocyanates in combination so long as the solubility is retained.

The water-soluble polyurethane compound can be synthesized by a process carried out under conditions which are not particularly novel for the reaction itself. The reaction may typically be carried out according to the following procedure.

[1] Block type urethane oligomer:

(1) Conversion of hydrophobic diol into oligomer:

A hydrophobic diol is dissolved in a solvent having no active hydrogen. Here, preferable solvents include dialkyl ethers of glycol compounds, diesters thereof, N-methylpyrrolidone, dimethylformamide, ketones, dioxane, acetates and halogenated aromatic compounds. The solution thus prepared is kept at 60° to 110° C., and a diisocyanate compound solution is dropwise with stirring to carry out the reaction. Viscosity and hydroxyl number of the reaction mixture are monitored until it reaches a given conversion, where the addition is stopped. Subsequently, a catalyst solution for urethane-forming reaction is added dropwise, and the mixture is stirred for several hours at the same temperature or, if possible, at an elevated temperature. In this way, the reaction of the diisocyanate is completed so that no unreacted diisocyanate may remain. Such a measure, though known in the art, is important in order for difficulties such as gelation not to occur in the subsequent reaction. Thus, a hydroxyl group-terminated hydrophobic diol oligomer is obtained.

(2) Conversion of carboxyl type diol into oligomer:

The reaction to convert the carboxyl type diol into an oligomer basically follows the same procedure as the above. More specifically, in order to prevent carboxyl groups and isocyanate from reacting, the reaction temperature is controlled to 60° C. or below, and preferably around 45° C. Care should be taken in the rate of addition so that any temperature rise accompanied with the reaction may not exceed 80°

C. Thus, an isocyanate-terminated carboxyl type diol oligomer is obtained.

(3) Formation of block type urethane oligomer from hydrophobic diol oligomer and carboxyl type diol oligomer:

This reaction is carried out by dissolving each oligomer in a polar solvent such as DMF and a urethane-forming catalyst is added to the hydrophobic diol oligomer side. The resulting solution is added dropwise added in an isocyanate-terminated carboxyl type diol oligomer solution. The ratio of amounts of the substances to be reacted depends on the intended block structure, but average repeating numbers depend on the molar numbers of the isocyanate and hydroxyl group. When the substances formed are taken out in the form of their aqueous solution, 8 given base is added at the stage where the reaction has been completed, to bring them into a soluble state, and, while removing DMF by distillation under reduced pressure, the Water and the base are slowly supplemented, in the course of which the mixture is replaced with an aqueous system. The aqueous solution can be thus obtained. The base used here includes alcohol amines such as ethanol amine, diethanol amine and tridi-ethanol amine, aminoalcohols as typified by aminomethyl alcohol, ammonia, cyclic amines such as morpholine and piperidine, alkali metals, and alkylamines.

[2] Random type urethane oligomer:

It is of course possible to combine the above hydrophobic diol and the carboxyl type diol in a random form. Such a substance can be obtained by mixing the respective diols in given amounts, followed by reaction in one lot while diisocyanate is added dropwise. In this instance, in order for the hydrophobic diol and carboxyl type diol oligomers to be alternately brought into a chain as far as possible, it is important to select a solvent that can dissolve both the diols in common and can dissolve the formed urethane compound will also.

The water-soluble urethane oligomer used in the present invention may have various structures. When the urethane oligomer comprising a hydrophobic diol is represented by UA and, the urethane oligomer comprising a hydrophilic diol by UB, the following structures are exemplified.

1. UA—UB—UA,

2. UB—UA—UB,

3. UA—UB,

4. [UA—UB—UA]$_m$,

5. [UB—UA—UB]$_m$,

6. UB————UB,
      |
      UA

7. UA————UA,
      |
      UB

8. [UA—UB]$_L$.

In the case when they are combined at random, the oligomer can not have functionally separated structures as shown above, and hence is characterized by having, though a low surface active performance, a rather high compatibility. Of these, preferable structures are the functionally separated structures as shown above.

The water-soluble urethane oligomer of the present invention, synthesized in the manner as described above, has a molecular weight of approximately from 500 to 5,000, and preferably 3,500 or less. If it has a molecular weight of more than 5,000, disadvantages of a decrease in solubility and also an increase in viscosity may result.

The ink according to the second embodiment of the present invention contains as a novel compound the water-soluble urethane oligomer having a surface active performance as described above. The water-soluble urethane olgomer, compared with conventionally known surface active agents, has a repeating structure to have a large degree of polymerization and makes it easy to control penetration rate. It is also a polymer having a large number of anionic groups, and hence is characterized by greatly increased viscosity and which really causes irregular feathering when the media (water and water-soluble organic solvent) evaporate from the ink on recording paper and penetrate into the recording paper. Addition of a water-soluble polymer such as a styrene/acrylic acid copolymer, polyvinyl pyrrolidone or a sugar/cellulose derivative is conventionally known to be effective for decreasing irregular feathering because of an increase in viscosity. When, however, the water-soluble urethane oligomer of the present invention is used, it acts to decrease irregular feathering after it has acted to increase penetration rate. Hence, it is possible to prevent the irregular feathering while increasing the fixing speed.

The reason why this oligomer desirably acts in this way is unclear, and is presumed as follows:

1. At the initial stage of drying, the ink penetrates into large voids. The hydrophobic group having a high degree of freedom, possessed by the hydrophobic diol, are immediately adsorbed on the hydrophobio part on the surface of paper and the surfaces of voids to promote the penetration of ink.

2. The water begins to evaporate, and, in the course of drying, the viscosity of ink increases because of the cohesive force attributable to carboxyl groups. At the same time, because of a high affinity of the water-soluble organic solvent for the water-soluble urethane oligomer, the diffusion of ink into small voids stops, so that the irregular feathering on the recording paper decreases.

3. After the liquid media have evaporated, the hydrophobic side chain comes to the surface to prevent water fastness from being impaired. The oligomer is presumed to act in this way. Such effects attributable to the water-soluble urethane oligomer bring about the achievement of both the print quality level and the fixing performance that have hitherto been incompatible.

The water-soluble urethane oligomer may preferably be contained in the ink in an amount ranging from 0.05 to 5% by weight.

The coloring material used in the inks according to the first and second embodiments of the present invention may be any of water-soluble dyes and/or dispersions of the pigments. The water-soluble dyes include the dyes as disclosed in Japanese Patent Application Laid-open No. 59-93765, No. 59-174664, No. 59-56466 and No. 59-78273, i.e., azo, anthraquinone, fluorane, oxazine, dioxazine and phthalocyanine dyes. These are required to have a high purity, as those purified for use in ink-jet recording inks by the means as disclosed in Japanese Patent Application Laid-open No. 61-113668 and No. 61-113669. The pigments include azo type, phthalocyanine type, quinacridone type, anthraquinone type, dioxazine type, indigo type, thioindigo type, perynone type, perylene type, isoindolinone type, azomethineazo type pigments, and carbon black, as well as dispersions thereof.

The coloring material used in the present invention may be in any concentration so long as it is in a concentration high enough to impart sufficient coloring density to the recording medium. In general, it may preferably be used in a proportion of from 2 to 10% by weight in the ink. In the case when a pigment is used as the coloring material, it must be previously treated into an aqueous dispersion by the use of a dispersant. As a preferable dispersant, the addition polymerization type polymeric dispersant as disclosed in Japanese Patent Application Laid-open No. 56-147863 may be used. The aqueous dispersion should preferably be prepared according to the method as disclosed in Japanese Patent Application Laid-open No. 2-255855.

The ink of the present invention essentially employs the water-soluble organic solvent as an anti-drying agent. Such a water-soluble organic solvent may include amides such as γ-butyrolactone, dimethylformamide and dimethylacetamide; keto-alcohols such as diacetone alcohol; polyalkylene glycols such as polyethylene glycol and polypropylene glycol; alkylene glycols with an alkylene group having 2 to 6 carbon atoms, such as ethylene glycol, propylene glycol, butylene glycol, triethylene glycol, 1,2,6-hexanetriol, 1,2,4-butanetriol, 1,2,5-pentanetriol, glycerol, trimethylolpropane, pentaerythritol, thiodiglygol, hexylene glycol and diethylene glycol; lower alkyl ethers of polyhydric alcohols, such as ethylene glycol monomethyl or -ethyl ether and triethylene glycol monomethyl or -ethyl ether; lower dialkyl ethers of polyhydric alcohols, such as triethylene glycol dimethyl or diethyl ether and tetraethylene glycol dimethyl or diethyl ether; sulforane, N-methylpyrrolidone, and 1,3-dimethyl-2-imidazolidinone.

The water-soluble organic solvent used in the present invention is required in the first place to be so used that the ink as a composition of all materials has a viscosity of approximately 6 cP or less (25° C.) and a surface tension in the range of from 30 to 60 dyne/cm (25° C.). The water-soluble organic solvent as a humectant may preferably be in a concentration ranging from 5 to 40% by weight.

The pigment ink in the present invention may be prepared by first adding the pigment to an aqueous solution containing at least the dispersion resin according to the present invention and water, followed by stirring and thereafter dispersion using a dispersion means described later, further optionally followed by centrifugal separation to give the desired dispersion. Next, the compound used in the present invention and the components as described above are added to this dispersion, followed by stirring to obtain a recording solution, the ink.

In instances in which an alkali-soluble resin is used, it is necessary to add a base in order to dissolve the resin. It is also effective to carry out premixing for 30 minutes or more before an aqueous solution containing a pigment is dispersed. This premixing enables improvement in wettability of the pigment surface to promote adsorption of resin on the pigment surface. As the base added to the dispersion when the alkali-soluble resin is used, organic amines such as monoethanolamine, diethanolamine, triethanolamine, aminomethylpropanol and ammonia or inorganic bases such as potassium hydroxide and sodium hydroxide are preferable. As for the dispersion means, it may be any of dispersion machines commonly used, including, for example, a ball mill, a roll mill and a send mill. In particular, a high-speed sand mill is preferred, as exemplified by Super mill, Sand grinder, Beads mill, Agitator mill, Grain mill, Dyno mill, Pearl mill end Coball mill (all trade names). In the present invention, a pigment with a desired particle size distribution can be obtained by a method in which a tumbling medium of the dispersion machine is made to have a small size, the tumbling medium is used in a large packing fraction, the dispersion is carried out for a long time, pulverized products are slowly discharged, or, after being pulverized, they are classified using a filter or a centrifugal separator. Any Of these methods may also be used in combination.

The recording apparatus suited for making a record by using the ink of the present invention may include apparatus capable of imparting heat energy corresponding with recording signals to the ink in a recording head to cause ink droplets to be produced by the energy. Particularly in the present invention, the recording head need not be subjected to ink-repellent treatment on its surface, but it is more preferable and effective for the recording head to be thus treated. When not subjected to ink-repellent treatment, the liquid may seriously stagnate around ejection orifices also in the case of dye type inks. Particularly when the ink according to the present invention is used, a head subjected to an ink-repellent treatment is effective.

There are no particular limitations on methods for the ink-repellent treatment. For example, the head surface may be treated with silicone oil, fluorine-containing low-molecular and high-molecular compounds or the like. Such ink repellants may specifically include a number of agents, such as KP-801 (trade name.; available from Shin-Etsu Silicon Co., Ltd.), DEFENSER (trade name; available from Dainippon Ink & Chemicals, Inc.), CTX-105 and -805 (trade names; available from Asahi Glass Go., Ltd.), TEFLON AF (trade name; available from Du Pont Co.), etc. The treatment can be made by known methods as disclosed, for example, in Japanese Patent Application Laid-open No. 64-31642.

The recording apparatus of the present invention will be described below.

In the present invention, preferred is a system in which recording signals are given to the recording ink in the recording head to eject ink droplets therefrom by the action of heat energy thereby produced. It is also possible to use a recording head employing a electromechanical conversion device.

Figure 2:
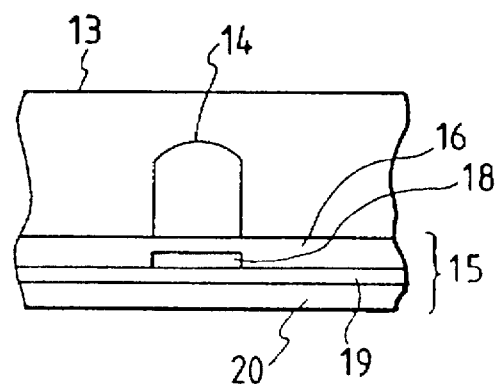
FIG. 2 is a cross section along the line 2—2 in FIG. 1.
Figure 3:
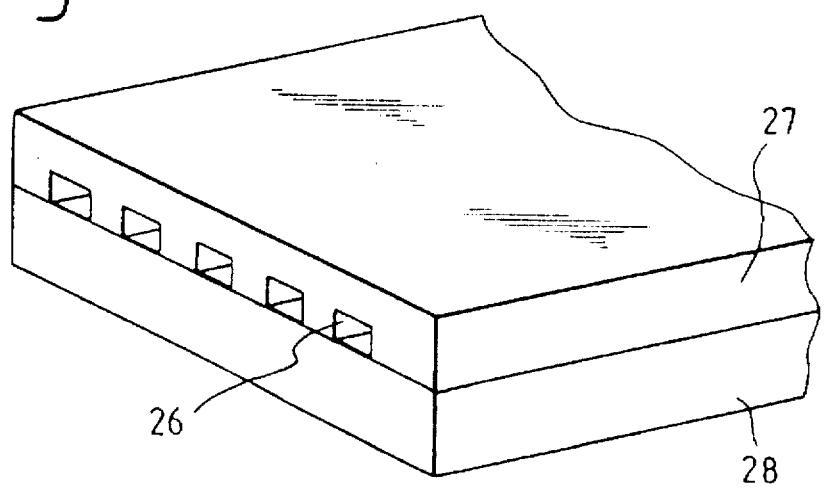
FIG. 3 is a perspective illustration of the appearance of a multiple head comprising the head as shown in FIG. 1.

FIGS. 1, 2 and 3 show examples of the construction of the recording head, which is a main component of the apparatus utilizing the heat energy. A head 13 is formed by bonding a glass, ceramic or plastic plate or the like provided with an ink flow path 14, to a heating head 15 having a heating resistor used in thermal recording (the drawing shows a head, to which, however, the invention is not limited). The heating head 15 is comprised of a protective film 16 formed of silicon oxide or the like, aluminum electrodes 17-1 and 17-2, a heating resistor layer 18 formed of nichrome or the like, a heat accumulating layer 19, and a substrate 20 with good heat dissipation properties, made of alumina or the like.

The ink 21 reaches an ejection orifice 22 and a meniscus 23 is formed there by a pressure. Now, upon application of electric signals to the electrodes 17-1 and 17-2, heat is abruptly generated at the region denoted by n in the thermal head 15, so that bubbles are generated in the ink 21 coming into contact with this region. The pressure thus produced thrusts out the meniscus 23 and the ink is ejected from the orifice 22 in the form of recording minute drops 24 to fly against a recording medium 25. FIG. 3 schematically illustrates a recording head comprising the head as shown in FIG. 1 arranged in a large number. This recording head is prepared by closely adhering a glass plate 27 having a large number of flow paths 26, to a heating head 28 similar to the head as illustrated in FIG. 1.

Figure 4:
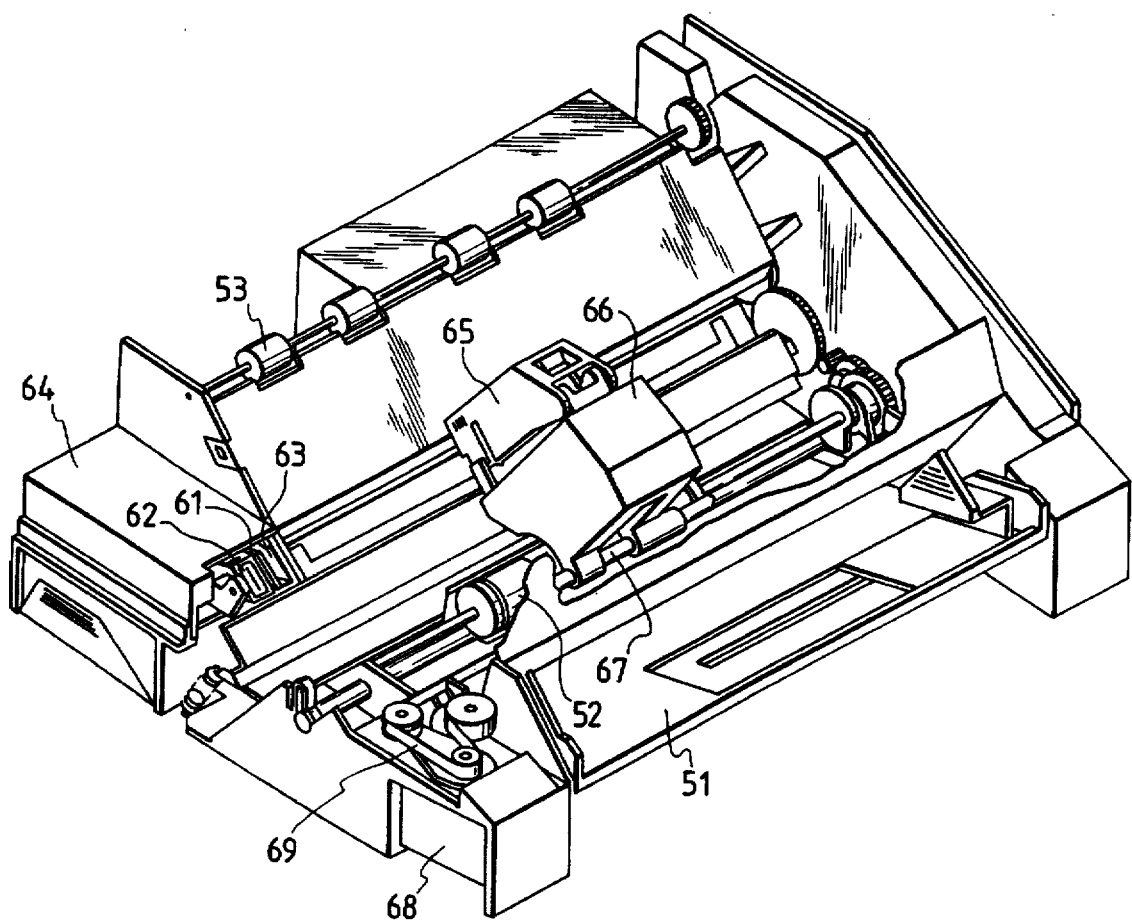
FIG. 4 is a perspective illustration of an example of ink-jet recording apparatus.

FIG. 1 is a cross-sectional view of the head 13 along its ink flow path, and FIG. 2 is a cross-sectional view along the line 2—2 in FIG. 1. FIG. 4 shows an example of the ink-jet recording apparatus in which such a head has been incorporated. In FIG. 4, reference numeral 61 denotes a blade serving as a wiping member in the form of a cantilever, one end of which is a stationary end retained by a blade-retaining member. The blade 61 is provided at the position adjacent to the region in which a recording head makes a record. In the present example, the blade is retained in such a form that it projects to the course through which the recording head is moved. Reference numeral 62 denotes a cap, which is provided at the home position adjacent to the blade 61, and is so constituted that it moves in the direction perpendicular to the direction in which the recording head is moved and comes into contact with the face of ejection openings to carry out capping. Reference numeral 63 denotes an ink absorber provided adjoiningly to the blade 61, and, similar to the blade 61, is retained in such a form that it projects to the course through which the recording head is moved.

The above blade 61, cap 62 and absorber 63 constitute an ejection restoration assembly 64, where the blade 61 and the absorber 63 remove water, dust or the like from the ink ejection opening face. Reference numeral 65 denotes the recording head having an ejection energy generating means and which ejects ink to the recording medium set opposite to the ejection opening face provided with ejection openings, to carry out recording. Reference numeral 66 denotes a carriage on which the recording head 65 is mounted so that the recording head 65 can be moved. The carriage 66 is slidably associated with a guide shaft 67. Part of the carriage 66 is connected (not shown) with a belt 69 driven by a motor 68. Thus, the carriage 66 can be moved along the guide 67 and hence the recording head 65 can be moved from a recording region to a region adjacent thereto.

Reference numeral 51 denotes a paper feeding part from which recording media are inserted, and 52 is a paper feed roller driven by a motor (not shown). With such construction, the recording medium is fed to the position opposite to the ejection opening face of the recording head, and, with the progress of recording, is outputted from a paper output section provided with a paper output roller.

In the above construction, the cap 62 of the head restoration assembly 64 recedes from the moving course of the recording head 65 when the recording head 65 is returned to its home position, e.g., after completion of recording, and the blade 61 stands projected to the moving course. As a result, the ejection opening face of the recording head 65 is wiped. When the cap 62 comes into contact with the ejection opening face of the recording head 65 to carry out capping, the cap 62 is moved in such a way that it projects to the moving course of the recording head. When the recording head 65 is moved from its home position to the position at which recording is started, the cap 62 and the blade 61 are at the same position as the position where the ejection opening face is wiped. As a result, the ejection opening face of the recording head 65 is wiped also at the time of this movement.

The above movement of the recording head to its home position is made not only at the time of the completion of recording or restoration of ejection, but also when the recording head is moved between recording regions for the purpose of recording, during which it is moved to the home position adjacent to each recording region at given intervals, where the ejection opening face is wiped in accordance with this movement.

Figure 5:
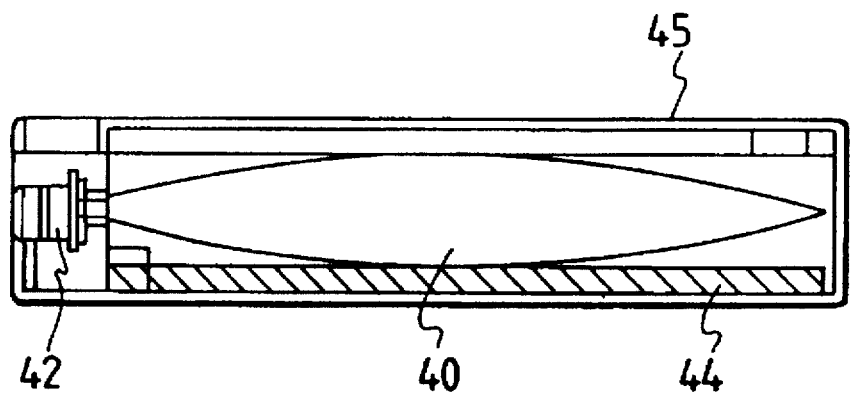
FIG. 5 is a vertical cross-sectional illustration of an ink cartridge.
Figure 6:
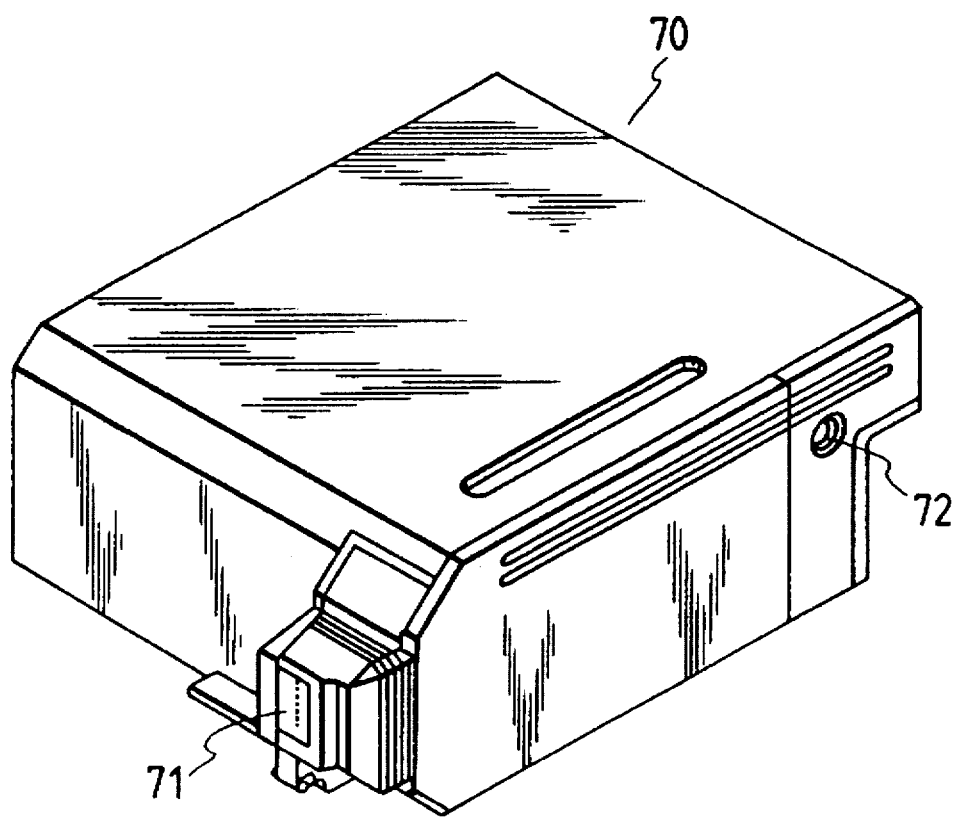
FIG. 6 illustrates another example of the ink cartridge.

FIG. 5 shows an example of an ink cartridge, denoted as 45, that holds the ink fed to the head through an ink-feeding tube. Herein reference numeral 40 denotes an ink bag that holds the feeding ink. The top thereof is provided with a stopper 42 made of rubber. A needle (not shown) may be inserted into this stopper 42 so that the ink in the ink holder 40 can be fed to the head. Reference numeral 44 denotes an absorber that receives waste ink. The ink-jet recording apparatus used in the present invention is not limited to the apparatus as described above in which the head and the ink cartridge are separately provided, and a device can also be preferably used in which these are integrally formed as shown in FIG. 6. In FIG. 6, reference numeral 70 denotes an ink-jet cartridge, in the interior of which an ink absorber that holds an ink is contained. The recording unit is so constructed that the ink in such an ink absorber is ejected in the form of ink droplets from a head 71 having a plurality of orifices. Reference numeral 72 denotes an air path opening through which the interior of the cartridge is made to communicate with the atmosphere. This ink cartridge 70 can be used in place of the recording head 65 shown in FIG. 3, and is detachably mounted to the carriage 66.

EXAMPLES

The present invention will be described below by giving Examples. The present invention is by no means limited by them.

Synthesis Example 1

(Water-soluble oligomer 1)

BLENMER PE350 (trade name; available from Nippon Oil & Fats Co., Ltd.), acrylic acid and n-butyl acrylate were mixed in a weight ratio of 70:20:10, and the mixture was subjected to solution polymerization in ethyl cellosolve to yield a liquid polymer with a number average molecular weight of 6,500 and a glass transition temperature of $<-25°$ C. (this is designated as oligomer 1). Using this oligomer, an ink with the composition shown below was prepared.

Synthesis Example 2

(Water-soluble oligomer 2)

Butoxydiethylene glycol acrylate NK Ester AB-20G (trade name; available from Shin-Nakamura Chemical Co., Ltd.), acrylic acid and t-butyl acrylate were mixed in a weight ratio of 50:20:30, and the mixture was subjected to solution polymerization in ethyl cellosolve to yield a liquid polymer with a number average molecular weight of 5,000 and a glass transition temperature of 15° C. (this is designated as oligomer 2). Using this oligomer, an ink with the composition shown below was prepared.

Synthesis Example 3

(Water-soluble oligomer 3)

Nonylphenoxypentaethylene glycol acrylate NK Ester NPA-SE (trade name; available from Shin-Nakamura Chemical Co., Ltd.), β-methacryloyloxyethylhydrogen succinate ARONIX M5300 (trade name; available from Toagosel Chemical Industry Co., Ltd.) and styfane were mixed in a weight ratio of 35:45:20, and the mixture was subjected to solution polymerization in ethyl cellosolve to yield a liquid polymer with a number average molecular weight of 7,000 and a glass transition temperature of <−25° C. (this is designated as oligomer 3).

Synthesis Example 4

(Water-soluble oligomer 4)

Nonylphenoxyethyl acrylate NK Ester NPA-10G (trade name; available from Shin-Nakamura Chemical Co., Ltd.), 2-carboxyethyl methacrylate ARONIX M5600 (trade name; available from Toagosei Chemical Industry Co;, Ltd.) and lauryl acrylate were mixed in a weight ratio of 35:30:35, and the mixture was subjected to solution polymerization in ethyl cellosolve to yield a liquid polymer with a number average molecular weight of 4,000 and a glass transition temperature of <−25° C. (this is designated as oligomer 4).

Industry Co., Ltd.) and lauryl acrylate were mixed in a weight ratio of 35:30:35, and the mixture was subjected to solution polymerization in ethyl cellosolve to yield a liquid polymer with a number average molecular weight of 4,000 and a glass transition temperature of <−25° C. (this is designated as oligomer 5).

$$CH_2=C[COOCH(CH_2OH)\{CH_2COO(CH_2)_{14}-CH_3\}] \qquad (VI)$$

Using the foregoing five kinds of water-soluble oligomers, inks 1 to 5 with the compositions shown below were prepared (mixing ratios are all on the basis of part(s) by weight).

Example 1

(Ink 1)

| Water soluble black dye 1 of the following Formula | |
|---|---|
| (VII) | 3 parts |
| Glycerol | 10 parts |
| Ethylene glycol | 8 parts |
| Oligomer 1 | 1 part |
| Water | 78 parts |

(VII)

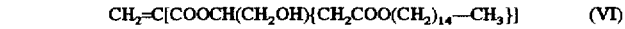

Synthesis Example 5

(Water-soluble oligomer 5)

A reaction product of palmitic acid monoester of glycerol with acrylic acid chloride, represented by the following Formula (VI), 2-carboxyethyl methacrylate ARONIX M5600 (trade name; available from Toagosei Chemical The above components were mixed and dissolved, followed by filtration using a filter with a pore size of 0.2 μm to obtain ink. The dye used was a dye having been desalted and purified for use in ink-jet recording.

Example 2

(Ink 2)

| Water soluble black dye 2 of the following Formula | |
|---|---|
| (VIII) | 3 parts |
| Thiodiglycol | 10 parts |
| Polyethylene glycol 300 | 5 parts |
| Isopropyl alcohol | 3 parts |
| Oligomer 2 | 1 part |
| Water | 78 parts |

Water soluble black dye 2 of the following Formula

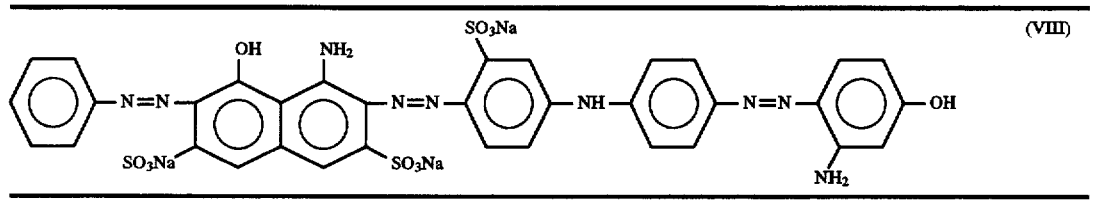
(VIII)

The above components were mixed and dissolved, followed by filtration using a filter with a pore size of 0.2 μm to obtain ink. The dye used was a dye having been desalted and purified for use in ink-jet recording.

Example 3

(Ink 3)

| | |
|---|---|
| Carbon black dispersion (a product with a solid content of 24%) | 20 parts |
| Glycerol | 10 parts |
| Ethylene glycol | 8 parts |
| Oligomer 3 | 1 part |
| Water | 61 parts. |

Preparation of the carbon black dispersion:

24 parts of carbon black MA-100 (trade name; available from Mitsubishi Chemical Industries Limited) and 100 parts (solid content: 6%) of an aqueous solution of a styrene acrylic acid type pigment dispersant JONCRYL 1000 (trade name; available from Johnson Polymer Co.) were put together and premixed over a period of 1 hour. Thereafter, the resulting mixture was dispersed for 5 hours by means of a sand mill using glass beads of 1 mm diameter. From the dispersion obtained, coarse particles were removed using a centrifugal separator to obtain a dispersion with a solid content of about 24% and an average particle diameter of 110 nm.

Example 4

(Ink 4)

| | |
|---|---|
| Carbon black dispersion (the same as the one used in ink 3) | 20 parts |
| Diethylene glycol | 10 parts |
| Urea | 3 parts |
| N-methylpyrrolidone | 4 parts |
| Oligomer 4 | 1 part |
| Water | 62 parts. |

Example 5

(Ink 5)

| | |
|---|---|
| Carbon black dispersion (the same as the one used in ink 3) | 20 parts |
| Diethylene glycol | 10 parts |
| Urea | 3 parts |
| N-methylpyrrolidone | 4 parts |
| Oligomer 5 | 1 part |
| Water | 62 parts. |

Use Example of Ink

BC-01 Cartridge (a recording head used in an ink-jet recording apparatus BJ-10V of a bubble jet type; trade name; manufactured by Canon Inc.) was filled with each ink prepared as described above, and printing was carried out to evaluate 1) print density, 2) occurrence of blurring, 3) drying time and 4) start-up performance in the following way.

Evaluation was also made on inks corresponding to the respective inks except that no water-soluble oligomer was added. Results obtained are shown together in Table 1 as comparative examples.

1) Print density:

Under simultaneous drive of all nozzles, solid print patches of 1.3 cm×2.0 cm each were formed on commercially available electrophotographic copy paper, and dried for 24 hours. Thereafter, the reflection density of the patches was measured.

2) Occurrence of blurring:

On commercially available electrophotographic copy paper, Chinese characters of 6 point to 12 point were respectively printed on three lines to evaluate how clearly they can be viewed. If blurring greatly occurs, Chinese characters with a large number of strokes can not be made out when they are printed in a small point number. As a result, the smallest point number of characters that were able to be made out was indicated.

3) Drying time:

On commercially available electrophotographic copy paper, alphabets and numerals were printed on a full page, and thereafter printed areas were rubbed with cleaning paper at intervals of 5 seconds in 5 to 45 seconds. Seconds taken until the printed areas no longer stained were counted to measure the drying time.

4) Start-up performance:

The cartridge was detached from the printer and left to stand in a room for 24 hours. Thereafter, it was again set on the printer to examine the state of printing again started (start-up performance). A case where printing was able to be started without problem from the beginning was evaluated as "A".

TABLE 1

|  | Ex. 1 | Cp. 1 | Ex. 2 | Cp. 2 | Ex. 3 | Cp. 3 | Ex. 4 | Cp. 4 | Ex. 5 | Cp. 5 |
|---|---|---|---|---|---|---|---|---|---|---|
| Print density: | | | | | | | | | | |
| Paper A: | 1.30 | 1.32 | 1.27 | 1.34 | 1.31 | 1.31 | 1.34 | 1.36 | 1.32 | 1.30 |
| Paper B: | 1.27 | 1.25 | 1.31 | 1.32 | 1.28 | 1.26 | 1.29 | 1.31 | 1.32 | 1.30 |
| Blurring: | | | | | | | | | | |
| Paper A: | 6 | 9 | 6 | 8 | 6 | 9 | 6 | 10 | 6 | 9 |
| Drying time: | | | | | | | | | | |
| Paper A: | <5 | 15 | 5 | 20 | 5 | 25 | 5 | 20 | 5 | 25 |
| Paper B: | 5 | 20 | 5 | 25 | 5 | 30 | 5 | 25 | 5 | 30 |
| Start-up performance: | A | A | A | A | A | A | A | A | A | A |

Ex.: Example,
Cp.: Comparative Example
Paper A: Canon electrophotographic copying paper, NP-SK
Paper B: Xerox electrophotographic copying paper, Xerox 4024

Synthesis Example 6

Urethane Oligomer Comprising Hydrophobic Diol, UA-1:

In 300 g of ethyl cellosolve acetate, 0.5 mol (11.3 g) of SURFYNOL 104 (trade name; available from Nisshin Chemical Industry Works, Ltd.; hydrophobic diol (1) in the present disclosure) was dissolved, and the resulting solution was put in a flask equipped with a nitrogen bubble device, a dropping funnel and a stirrer. A solution comprised of a mixture of 0.45 mol (about 75.6 g) of hexamethylene diisocyanate and 100 g of ethyl cellosolve acetate was put in the dropping funnel. While heating the flask at 65° C., stirring its content and feeding dry nitrogen, the solution was dropwise added over a period of 3 hours to carry out the reaction. Thereafter, the stirring was continued for 4 hours. In that course, the temperature rose to 105° C. at maximum. At the stage where the temperature in the flask dropped to 80° C., a toluene solution of dibutyltin dilaurate (effective content: 0.1 g) was dropwise added, and the reaction was further continued for 2 hours, where the urethane-forming reaction was completed. Thus, a compound with a number average molecular weight of 1,300 was obtained.

Synthesis Example 7

Urethane Oligomer Comprising Hydrophilic Diol, UB-1:

In 350 g of ethyl cellosolve acetate, 1 mol (134 g) of dimethylolpropionic acid (a product available from Fujiiy-oshi Co., Ltd.; hydrophilic diol (1) in the present disclosure) was dissolved, and the resulting solution was put in a flask equipped with a nitrogen bubble device, a dropping funnel and a stirrer. A solution comprised of a mixture of 0.9 mol (about 156 g) of hexamethylene diisocyanate and 100 g of butyl cellosolve acetate was put in the dropping funnel. While heating the flask at 45° C., stirring its content and feeding dry nitrogen, the solution was dropwise added over a period of 3 hours to carry out the reaction. Thereafter, the stirring was continued for 4 hours. In that course, the temperature rose to 80° C. at maximum. At the stage where the temperature in the flask dropped to 60° C., a toluene solution of dibutyltin dilaurate (effective Content: 0.2 g) was dropwise added, and the reaction was further continued for 2 hours, where the urethane-forming reaction was completed. Thus, a compound with a number average molecular weight of 1,560 was obtained.

Synthesis Example 8

Water-soluble Urethane Oligomer UC-1 Comprised of UA-1 and UB-1:

In 150 g of DMF, 35 g of UA-1 and 0.1 g of dibutyltin dilaurate were dissolved, and the resulting solution was put in a flask equipped with a nitrogen bubble device, a dropping funnel and a stirrer. A solution prepared by dissolving 80 g of UB-1 in 200 g of DMF was put in the dropping funnel. While heating the flask at 80° C., stirring its content and feeding dry nitrogen, the solution was dropwise added over a period of 1.5 hours to carry out reaction. Thereafter, the stirring was continued for 4 hours. In that course, the temperature rose to 95° C. at maximum. At the stage where the temperature in the flask dropped to 75° C., a toluene solution of dibutyltin dilaurate (effective content: 0.04 g) was dropwise added, and the reaction was further continued for 2 hours, where the urethane-forming reaction was completed. Thus, a compound with a number average molecular weight of 4,800 was obtained. An ideal structure of the compound thus produced is a block structure of [UB-1]-[UA-1]-(UB-1].The substance obtained was neutralized with monoethanolamine, followed by removal of DMF, and formed into an aqueous solution.

Synthesis Example 9

Urethane Oligomer Comprising Hydrophobic Diol, UA-2:

In 350 g of ethyl cellosolve acetate, 0.3 mol (200 g) of SURFYNOL 465 (trade name; available from Nisshin Chemical Industry Works, Ltd.; hydrophobic diol (2), in which sum of (m+n) is 10, in the present disclosure) was dissolved, and the resulting solution was put in 8 flask equipped with a nitrogen bubble device, a dropping funnel and a stirrer. A solution comprised of a mixture of 0.2 mol (about 33.6 g) of hexamethylene diisocyanate and 100 g of ethyl cellosolve acetate was put in the dropping funnel. The subsequent procedure in Synthesis Example 1 was repeated to carry out the reaction. After precipitation purification with ethanol, 8 compound with a number average molecular weight of 2,300 was obtained.

Synthesis Example 10

Urethane Oligomer Comprising Hydrophilic Diol, UB-2:

In 300 g of ethylene glycol dimethyl ether, 0.5 mol (120 g) of a reaction product of glycerol with phthalic anhydride (hydrophilic diol (5) in the present disclosure) was dissolved, and the resulting solution was put in a flask equipped with a nitrogen bubble device, a dropping funnel and a stirrer. A solution comprised of a mixture of 0.37 mol (about 121 g) of isophorone diisocyanate and 200 g of ethylene glycol dimethyl ether was put in the dropping funnel. While heating the flask at 45° C., stirring its contents and feeding dry nitrogen, the solution was dropwise added over a period of 3 hours to carry out reaction. Thereafter, the stirring was continued for 4 hours. In that course, the temperature rose to 75° C. at maximum. At the stage where the temperature in the flask dropped to 60° C., a toluene solution of dibutyltin dilaurate (effective content: 0.2 g) was dropwise added, and the reaction was further continued for 3 hours, where the urethane-forming reaction was completed. Thus, a compound with a number average molecular weight of 1,870 was obtained.

Synthesis Example 11

Water-soluble Urethane Oligomer UC-2 Comprised of UA-2 and UB-2:

In 150 g of DMF, 40 g of UA-2 and 0.1 g of dibutyltin dilaurate were dissolved, and the resulting solution was put in a flask equipped with a nitrogen bubble device, a dropping funnel and a stirrer. A solution prepared by dissolving 60 g of UB-2 in 200 g of DMF was put in the dropping funnel. While heating the flask at 80° C., stirring its content and feeding dry nitrogen, the solution was dropwise added over a period of 1.6 hours to carry out the reaction. Thereafter, the stirring was continued for 4 hours. In that course, the temperature rose to 87° C. at maximum. At the stage where the temperature in the flask dropped to 65° C., a toluene solution of dibutyltin dilaurate (effective content: 0.04 g) was dropwise added, and the reaction was further continued for 2 hours, where the urethane-forming reaction was completed. Thus, a compound with a number average molecular weight of 4,500 was obtained. An ideal structure of the compound thus produced is a block structure of [UB-2]-[UA-2]. The substance obtained was neutralized with monoethanolamine, followed by removal of DMF, and formed into an aqueous solution.

Synthesis Example 12

Alternating Urethane Oligomer Comprised of Hydrophobic Diol and Hydrophilic Diol, UC-3:

In 250 g of ethyl cellosolve acetate, 0.5 mol (85 g) of SURFYNOL 82 (trade name; available from Nisshin Chemical Industry Works, Ltd.; hydrophobic diol (3) in the present disclosure) and 0.5 mol (141 g) of a reaction product of trimethylolpropane with orthophthalic anhydride (hydrophilic diol (7) in the present disclosure) were dissolved, and the resulting solution was put in a flask equipped with a nitrogen bubble device, a dropping funnel and a stirrer. A solution comprised of a mixture of 0.45 mol (about 75.6 g) of hexamethylene diisocyanate and 100 g of ethyl cellosolve acetate was put in the dropping funnel. The subsequent procedure in Synthesis Example 1 was repeated to carry out the reaction. After precipitation purification with ethanol, a compound with a number average molecular weight of 1,150 was obtained. The substance obtained was neutralized with monoethanolamine, followed by removal of ethyl cellosolve acetate, and formed into an aqueous solution.

Example 6

Preparation of Pigment Dispersion:

Components shown in Table 2 below were mixed, and the mixture was heated to 50° C. using a water bath to completely dissolve the resin component. To the resulting solution, 15 parts of carbon black newly produced as an experiment (MA-200, available from Mitsubishi Chemical Industries Limited) and 1.5 parts of isopropyl alcohol were added, followed by premixing for 30 minutes, and thereafter the mixture obtained was dispersed under conditions shown below. Dispersion machine: Sand grinder (manufactured by Igarashi Kikai K.K.)

Tumbling media: Zirconium beads of 1 mm diameter
Tumbling media packing fraction: 50%
Pulverizing time: 3 hours.

Centrifugal separation was further carried out (12,000 rpm; for 20 minutes) to remove coarse particles. Thus, a dispersion was formed.

TABLE 2

| Components of pigment dispersion | Amount* |
| --- | --- |
| Styrene/acrylic acid/butyl acrylate copolymer (glass transition temperature: 74° C.; acid value: 230; molecular weight: 6,700) | 2 |
| Monoethanolamine | 0.5 |
| Ion-exchanged water | 76 |
| Diethylene glycol | 5 |

*part(s) by weight

An ink formulated as shown in Table 3 below was tested using an ink-jet recording apparatus having an on-demand type multi-recording head capable of imparting heat energy corresponding with recording signals to thereby eject ink droplets.

TABLE 3

| Ink components | Amount * |
| --- | --- |
| Dispersion shown above | 30 |
| Glycerol | 3 |
| Diethylene glycol | 15 |
| N-methylpyrrolidone | 5 |
| Water-soluble urethane oligomer UC-1 | 2 (solid content) |
| Ion-exchanged water | 45 |

*part(s) by weight

Example 7

Components shown in Table 4 below were mixed, and the mixture was heated to 50° C. using a water bath to completely dissolve the resin component. To the resulting solution, 13 parts of carbon black (MCF88, available from Mitsubishi Chemical Industries Limited) was added, followed by premixing for 30 minutes, and thereafter the mixture obtained was dispersed under conditions shown below.

Dispersion machine: Pearl mill (manufactured by Ashizawa K.K.)
Tumbling media: Glass beads of 1 mm diameter
Tumbling media packing fraction: 50% (volume)
Discharge rate: 100 ml/min.

Centrifugal separation was further carried out (12,000 rpm; for 20 minutes) to remove coarse particles. Thus, a dispersion was formed.

TABLE 4

| Components of pigment dispersion | Amount* |
| --- | --- |
| Styrene/acrylic acid/ethyl acrylate copolymer (glass transition temperature: 87° C.; acid value: 1,750; molecular weight: 11,000) | 2.5 |
| Aminomethylpropanol | 0.5 |
| Ion-exchanged water | 78.0 |
| Diethylene glycol | 6 |

*part(s) by weight

An ink formulated as shown in Table 5 below was tested using an ink-jet recording apparatus having an on-demand type multi-recording head capable of imparting heat energy corresponding with recording signals to thereby eject ink droplets.

TABLE 5

| Ink components | Amount * |
| --- | --- |
| Dispersion shown above | 25 |
| Glycerol | 8 |
| Ethylene glycol | 5 |
| Ethanol | 5 |
| Water-soluble urethane oligomer UC-2 | 3.0 (solid content) |
| Ion-exchanged water | 54.0 |

*part(s) by weight

Example 8

TABLE 6

| Components of pigment dispersion | Amount* |
| --- | --- |
| Methyl methacrylate/acrylic acid/hydroxyethyl methacrylate copolymer (glass transition temperature: 86° C.; acid value: 145; molecular weight: 7,500) | 1.5 |
| Monoethanolamine | 0.5 |
| Ion-exchanged water | 77.5 |
| Ethylene glycol | 4.5 |

*part(s) by weight

Components shown in Table 6 above were mixed, and the mixture was heated to 70° C. using a water bath to completely dissolve the resin component. To the resulting solution, 15 parts of carbon black newly produced as an experiment (S170, available from Degussa Japan Co., Ltd.) and 1 part of isopropyl alcohol were added, followed by premixing for 60 minutes, and thereafter the mixture obtained was dispersed under conditions shown below.

Dispersion machine: Sand grinder (manufactured by Igarashi Kikai K.K.)
Tumbling media: Zirconium beads of 0.5 mm diameter
Tumbling media packing fraction: 70%
Pulverizing time: 10 hours.

Centrifugal separation was further carried out (12,000 rpm; for 20 minutes) to remove coarse particles. Thus, a dispersion was formed.

An ink formulated as shown in Table 7 below was tested using an ink-jet recording apparatus having an on-demand type multi-recording head capable of imparting heat energy corresponding with recording signals to thereby eject ink droplets.

TABLE 7

| Ink components | Amount* |
| --- | --- |
| Dispersion shown above | 30 |
| Glycerol | 12 |
| Diethylene glycol | 15 |
| 2-Pyrrolidone | 5 |
| Isopropyl alcohol | 3 |
| Water-soluble urethane oligomer UC-3 | 2 (solid content) |
| Ion-exchanged water | 33.0 |

*part(s) by weight

Example 9

A pigment dispersion was prepared, ink was formulated and a printing test was made in entirely the same manner as in Example 6 except that in the preparation of the pigment dispersion and the formulation of the ink the dispersion resin was replaced with an α-methylstyrene/methacrylic acid/ isobutyl acrylate copolymer (glass transition temperature: 96° C.; acid value: 243; molecular weight: 6,500) and UC-1 was used as the water-soluble urethane oligomer.

Example 10

Components shown in Table 8 below were mixed and dissolved, followed by filtration using a filter with a pore size of 0.2 μm to obtain ink. The dye used was a dye having been desalted and purified for use in ink-jet recording.

TABLE 8

| Ink components | Amount* |
| --- | --- |
| Water-soluble black dye as used in Example 2 | 3 |
| Glycerol | 10 |
| Ethylene glycol | 8 |
| Water-soluble urethane oligomer UC-1 | 1 |
| Water | 78 |

*part(s) by weight

BC-01 Cartridge (a recording head used in an ink-jet recording apparatus BJ-10V of a bubble jet type; trade name; manufactured by Canon Inc.) was filled with each ink thus prepared, and printing was carried out to evaluate performances on four items: 1) print density, 2) unevenness of color strength, 3) occurrence of blurring and 4) drying time.

Evaluation Methods

1) Print density:

Under simultaneous drive of all nozzles, solid print patches of 1.3 cm×2.0 cm each were formed on commercially available electrophotographic copy paper, and dried for 24 hours. Thereafter, the optical density of the patches was measured.

2) Unevenness of color strength:

Uniformity of samples on which the print density was measured was visually judged.
Judgement criteria:
A. Highly uniform;
B: Slightly uneven;
C: Considerably uneven.

3) Occurrence of blurring:

On commercially available electrophotographic copy paper, 300 dots were continuously printed in the manner that they did not touch one another, and allowed to dry naturally in a room for 24 hours. Thereafter, the number of dots having caused indefinite or irregular feathering was counted on a microscope, and its percentage was evaluated according to the following criteria.
Judgement critera:
A: 6% or less;
B: 7 to 12%;
C: 13 to 35%;
D: 36% or more.

4) Drying time:

On commercially available electrophotographic copy paper, alphabets and numerals were printed on a full page, and thereafter printed areas were rubbed with cleaning paper after 5, 10, 20 and 30 seconds. Seconds taken until the printed areas no longer stained were counted to measure the drying time.

Results of evaluation are shown together in Table 9.

Inks corresponding to those of Examples 6 and 10, except that the water-soluble urethane oligomers were each replaced with distilled water, were prepared as Comparative Examples 6 and 7. Results of evaluation similarly made are shown together in Table 9.

As is seen from Table 9, the inks to which the water-soluble urethane oligomer of the present invention has been added has superior fixing performance, quality level and useful reliability.

TABLE 9

|  | Ex. 6 | Cp. 6 | Ex. 7 | Ex. 8 | Ex. 9 | Ex. 10 | Cp.7 |
|---|---|---|---|---|---|---|---|
| Print density: (average) | 1.32 | 1.34 | 1.30 | 1.33 | 1.31 | 1.33 | 1.37 |
| Blurring: (%) | A | A | A | A | A | A | B |
| Unevenness of color strength: |  |  |  |  |  |  |  |
| Paper A: | A | B | A | A | A | A | C |
| Paper B: | A | B | A | A | A | A | C |
| Drying time: (seconds) | 10 | 25 | 10 | 10 | 15 | 10 | 15 |

Ex.: Example,
Cp.: Comparative Example

As described above, the ink of the present invention, when applied in ink-jet printers, has the advantages that it does not solidify at head tips even after being left standing for a long time, has a useful storage stability, can achieve its stable ejection despite variations in drive conditions or in its use for a long time, has a superior reliability and can provide prints with fastnesses to light, water and so forth as a matter of course; in particular, it has also no problem with respect to fastness to rubbing and has a superior utility.

According to the present invention, the ink-jet ink also comprises water, a water-soluble organic solvent, a water-soluble dye and/or pigment dispersion and a water-soluble oligomer having preferably an acid value of from 50 to 200, an number average molecular weight of less than 5,000 and containing 5 to 85% by weight of at least one specific monomer in its molecule. Thus, it can make a record on recording plain paper in a high print density, at a superior print quality level and in a good ink fixing performance.

What is claimed is:

1. An ink comprising water, a water-soluble organic solvent, a coloring material and a water-soluble oligomer, wherein said water-soluble oligomer has a glass transition temperature of 15° C. or below, is liquid at a normal temperature and under normal pressure, and is a polymer consisting essentially of at least one of monomers (1) selected from the group consisting of Formulae (I), (II) and (III) represented by the formula $$CH_2=C(R)-COO-(CH_2CH_2O)_m(CH_2)_pH \quad (I)$$

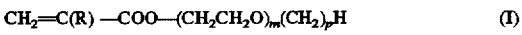

wherein R is a hydrogen atom or a methyl group, m is an integer of 2 to 24 and p is an integer of 1 to 16, the formula $$CH_2=C(R)-COO-(CH_2CH_2O)_q-phenyl-(CH_2)_rH \quad (II)$$

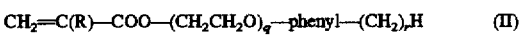

wherein R is a hydrogen atom or a methyl group, q is an integer of 2 to 24 and r is an integer of 0 to 16, and the formula $$CH_2=C(X)-COO-R_3 \quad (III)$$

wherein $R_3$ is $-CH(CH_2OZ_1)(CH_2OZ_2)$ or $-CH_2\{CHOZ_1(CH_2OZ_2)\}$, X is a hydrogen atom or a methyl group, one of $Z_1$ and $Z_2$ is a hydrogen atom and the other is an alkyl group having 4 to 16 carbon atoms or a residual group of an aliphatic acid ester, at least one of monomers (2) which imparts an acid value, and at least one of hydrophobic monomers (3); or a water-soluble polyurethane obtained from monomers comprising a carboxyl type hydrophilic diol having two hydroxyl groups and one or two carboxyl groups, a diisocyanate monomer and an acetylene glycol type hydrophobic diol represented by the formula $$R_1-CH_2-\underset{OR_3}{\underset{|}{C}}-C\equiv C-\underset{OR_4}{\underset{|}{C}}-CH_2-R_2 \quad (IV)$$

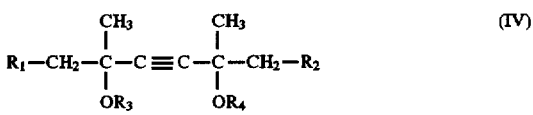

wherein $R_1$ and $R_2$ are each $CH_3-CH_2-$ or $$CH_3-CH-,$$
$$\quad |$$
$$\quad CH_3$$

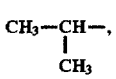

$R_3$ is $-(CH_2CH_2O)_nH$ and $R_4$ is $-(CH_2CH_2O)_mH$, where n+m is a number, N, wherein N=0 or $3 \leq N \leq 30$.

2. The ink according to claim 1, wherein said water-soluble oligomer has an acid value of from 50 to 200.

3. The ink according to claim 1, wherein said water-soluble oligomer contains at least one of the monomers (1) in an amount ranging from 5% by weight to 85% by weight.

4. The ink according to claim 1, wherein said water-soluble oligomer is used in the ink in a proportion of from 0.1% by weight to 5% by weight.

5. The ink according to claim 1, wherein said water-soluble oligomer containing the monomer of Formula (IV) is used in the ink in a proportion of from 0.05% by weight to 5% by weight.

6. The ink according to claim 1, wherein said water-soluble oligomer has a number average molecular weight of less than 7,000.

7. The ink according to claim 1, wherein said water-soluble polyurethane has a number average molecular weight of approximately from 500 to 5,000.

8. The ink according to claim 1, wherein said water-soluble polyurethane is used in the ink in a proportion of from 0.05% by weight to 5% by weight.

* * * * *

UNITED STATES PATENT AND TRADEMARK OFFICE
CERTIFICATE OF CORRECTION

PATENT NO. : 5,696,182
DATED : December 9, 1997
INVENTOR(S) : AKIO KASHIWAZAKI, ET AL.

It is certified that error appears in the above-identified patent and that said Letters Patent is hereby corrected as shown below:

ON THE COVER PAGE:

Item [57] ABSTRACT, Lines 13-17,

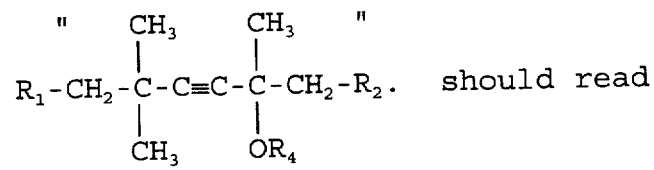 should read

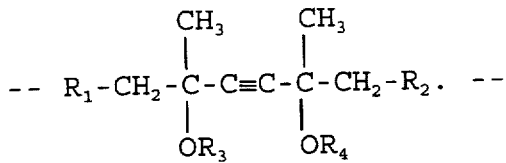 --

COLUMN 1:

Line 65, "penetrate" should read --penetrate,--.
   Line 66, "of" should read --of the--. (second occurrece).

COLUMN 3:

Line 56, "Orifice," should read --orifice,--.

COLUMN 5:

Line 66, "Of" should read --of--.

UNITED STATES PATENT AND TRADEMARK OFFICE
CERTIFICATE OF CORRECTION

PATENT NO. : 5,696,182  Page 2 of 4
DATED : December 9, 1997
INVENTOR(S) : AKIO KASHIWAZAKI, ET AL.

It is certified that error appears in the above-identified patent and that said Letters Patent is hereby corrected as shown below:

COLUMN 6:

Line 11, "$CH_3$-$CH_2$" should read -- $CH_3$-$CH_2$- or --.
Line 16, before "a" insert --$R_3$ is -($CH_2CH_2O$)$_n$-H and $R_4$ is -($CH_2CH_2O$)$_m$-H, where n + m is--.

Line 61, "said" should read --acid--.

COLUMN 7:

Line 3, "antonic" should read --anionic--.

COLUMN 8:

Line 24, "buffet-" should read --biuret- --.
Line 47, "is" should read --is added--.
Line 67, "accompanied with" should read --accompanying--.

COLUMN 9:

Line 9, "added in" should read --in--.
Line 15, "8" should read --a--.
Line 18, "Water" should read --water--.
Line 36, "will" should read --well,--.

COLUMN 10:

Line 7, "olgomer," should read --oligomer--.
Line 23, "desirably acts" should read --acts desirably--.

UNITED STATES PATENT AND TRADEMARK OFFICE
CERTIFICATE OF CORRECTION

PATENT NO. : 5,696,182    Page 3 of 4
DATED : December 9, 1997
INVENTOR(S) : AKIO KASHIWAZAKI, ET AL.

It is certified that error appears in the above-identified patent and that said Letters Patent is hereby corrected as shown below:

COLUMN 10:

Line 26, "group" should read --groups--.
Line 28, "hydrophobio" should read --hydrophobic-- and "of" should read --of the--.

COLUMN 11:

Line 9, "No. 2-255855." should read --No. 2-255875.--.
Line 65, "end" should read --and--.

COLUMN 12:

Line 6, "Of" should read --of--.

COLUMN 19:

Line 28, "end" should read --and--.
Line 30, "8" should read --a--.

COLUMN 20:

Line 53, "8" should read --a--.
Line 60, "8" should read --a--.

COLUMN 21:

Line 28, "1.6 hours" should read --1.5 hours--.

UNITED STATES PATENT AND TRADEMARK OFFICE
CERTIFICATE OF CORRECTION

PATENT NO. : 5,696,182
DATED : December 9, 1997
INVENTOR(S) : AKIO KASHIWAZAKI, ET AL.

It is certified that error appears in the above-identified patent and that said Letters Patent is hereby corrected as shown below:

COLUMN 22:

Line 56, "under" should read --under the--.

COLUMN 25:

Line 54, "5,000" should read --7,000--.

Signed and Sealed this

Twenty-fifth Day of August, 1998

Attest:

BRUCE LEHMAN

*Attesting Officer*   *Commissioner of Patents and Trademarks*